United States Patent [19]

Sugiyama et al.

[11] Patent Number: 4,499,505

[45] Date of Patent: Feb. 12, 1985

[54] APPARATUS FOR PLAYING BACK VIDEO SIGNALS RECORDED ON A ROTARY RECORDING MEDIUM ON SEVERAL QUASI-SLOW MOTION REPRODUCTION MODES

[75] Inventors: Hiroyuki Sugiyama, Isehara; Ryozo Abe, Yokohama; Kenji Yoshihara, Chiba, all of Japan

[73] Assignee: Victor Company of Japan, Ltd., Yokohama, Japan

[21] Appl. No.: 307,582

[22] Filed: Oct. 1, 1981

[30] Foreign Application Priority Data

Oct. 3, 1980 [JP] Japan .................... 55-138329

[51] Int. Cl.³ .................... H04N 5/76; G11B 21/08
[52] U.S. Cl. .................... 358/342; 358/907; 360/10.1; 369/47
[58] Field of Search ............... 358/312, 337, 341–343, 358/907; 360/9.1, 10.1, 10.2, DIG. 1; 369/43, 47, 126

[56] References Cited

U.S. PATENT DOCUMENTS

| Re. 29,963 | 4/1979 | Janssen .................... 358/342 |
| 3,973,080 | 8/1976 | Dickopp et al. ............ 369/47 X |
| 4,164,756 | 8/1979 | Toda et al. ............... 369/47 X |
| 4,247,741 | 1/1981 | Tatsuguchi et al. ......... 369/47 X |
| 4,322,748 | 3/1982 | Tatsuguchi ................. 358/342 |
| 4,330,879 | 5/1982 | Wine ..................... 369/126 X |
| 4,340,907 | 7/1982 | Hirata et al. ............. 369/47 X |
| 4,402,070 | 8/1982 | Sugiama et al. ............... 369/43 |
| 4,414,584 | 11/1983 | Kurata ..................... 358/342 |
| 4,417,285 | 11/1983 | Mes ........................ 358/342 |
| 4,423,497 | 2/1983 | Sugiama et al. ............... 369/47 |
| 4,425,587 | 1/1984 | Kurata ..................... 358/335 |

FOREIGN PATENT DOCUMENTS 2902038 7/1979 Fed. Rep. of Germany .
2225804 11/1974 France .
2282693 3/1976 France .
2415403 8/1978 France .

Primary Examiner—Raymond F. Cardillo, Jr.
Attorney, Agent, or Firm—Louis Bernat

[57] ABSTRACT

A rotary recording medium reproducing apparatus for reproducing a rotary recording medium in which a plurality of fields of video signals are recorded for each track turn on a spiral track comprises a reproducing transducer having a reproducing element for scanning over tracks on the rotary recording medium to reproduce recorded signals, and shifting device responsive to a signal applied thereto for shifting the reproducing element towards the outer side or the inner side on the rotary recording medium, and a circuit for producing shifting a signal in order to shift the reproducing element by one track pitch towards the outer side on the rotary recording medium every time the reproducing element reaches one predetermined position on the rotary recording medium, and capable of producing a shifting signal for shifting the reproducing element towards the outer side or the inner side on the rotary recording medium according to the slow-motion ratio and the direction of the slow-motion reproduction when the reproducing element reaches another predetermined position on the rotary recording medium. The shifting signal is supplied to the shifting device. The tracks are reproduced a plurality of times with respect to each track turn, to perform a slow-motion reproduction.

6 Claims, 8 Drawing Figures

1/3 FWD

1/3 BWD

APPARATUS FOR PLAYING BACK VIDEO SIGNALS RECORDED ON A ROTARY RECORDING MEDIUM ON SEVERAL QUASI-SLOW MOTION REPRODUCTION MODES

BACKGROUND OF THE INVENTION

This invention generally relates to apparatus for playing a rotary recording medium in a quasi-slow-motion reproduction, and more particularly to apparatus for playing a rotary recording medium in a quasi-slow-motion reproduction, in either the forward direction or the backward direction by a use of a simple circuit construction.

Systems have been realized in which a recording system forms pits in accordance with an information signal to record the information signal along a spiral track on a flat rotary recording medium (hereinafter referred to as disc), without requiring a groove to be formed therein. A reproducing stylus traces over this track to reproduce the recorded information signal in response to variations in the electrostatic capacitance which result from the recorded pits.

In this system, since no groove is provided on the disc for guiding the reproducing stylus, pilot or reference signals are recorded on or in the vicinity of a track of the information signal, such as a video signal. Upon reproduction, the reference signals are reproduced together with the video signal. A tracking servo control is carried out so that the reproducing stylus accurately traces along the track in response to the reproduced reference signals.

In the above disc, either one of first and second reference signals fp1 and fp2 is recorded at an intermediate position between center lines of adjacent track turns. Moreover, the side on which the first and second reference signals are recorded with respect to one track turn changes over every one track turn. That is, when the first and second reference signals are respectively recorded on the right and left sides of one track turn, the relationship between the recorded positions of the reference signals is such that the second and first reference signals are respectively recorded on the right and left sides of adjacent track turns. Furthermore, a third reference signal is used as a changeover signal for telling the servo system whether is recorded for every track turn at recording changeover the first or the second reference signal is on the right or the left.

In a reproducing apparatus, a changeover operation is performed in response to the third reference signal to provide a servo tracking control signal from the reproduced first and second reference signals.

Since no grooves are provided on the above disc, the reproducing stylus can be transferred laterally from one track to another, without damaging either the reproducing stylus or the disc. Accordingly, in addition to the special reproduction such as still reproduction, slow-motion reproduction, and quick-motion reproduction, the system is capable of performing a random access in which the reproducing stylus is transferred to a desired position at high speed to reproduce the desired information.

On the other hand, due to the restriction on the relative speed between the disc and the reproducing stylus, the recording capacity of the disc, the size of the disc and the like, the discs which have been realized are standardized so that two frames, that is, four fields of video signals are recorded on each track turn of the disc. Accordingly, the disc has the vertical synchronizing signal recorded at four positions for every track turn of the disc. Furthermore, the third reference signal is recorded at one predetermined vertical synchronizing signal recorded position corresponding to the recording changeover position of the above first and second reference signals.

When a slow-motion reproduction is to be performed with respect to the above type of a disc, the reproducing stylus is kicked or shifted from one track to an adjacent track at the position where a vertical synchronizing signal is recorded, so that noise is not generated in the slow-motion reproduced picture. Therefore, in the conventional slow-motion reproduction system, the above described kicking or shifting of the reproducing stylus was performed at one or a plurality of radial positions where the four vertical synchronizing signal are recorded within one track turn. The stylus is kicked according to the slow-motion ratio and according to whether the slow-motion reproduction is in the forward direction or the backward direction.

However, in this conventional system, the vertical synchronizing signals are at positions which may vary. Therefore, the reproducing stylus is kicked or shifted according to the slow-motion ratio and the direction of the slow-motion reproduction, respectively vary. Hence, there was a disadvantage in that the circuit had to be too complex in order to form kick or shift pulses at the positions where the vertical synchronizing signals are recorded in accordance with the slow-motion ratio and the direction of the slow-motion reproduction.

SUMMARY OF THE INVENTION

Accordingly, it is a general object of the present invention to provide a novel and useful apparatus for playing a rotary recording medium in a quasi-slow-motion reproduction, in which the above described disadvantages have been overcome.

Another and more specific object of the present invention is to provide an apparatus for playing a rotary recording medium in a quasi-slow-motion reproduction by kicking or shifting a reproducing stylus. The shaft always occurs at predetermined mutually opposing positions where vertical synchronizing signal are recorded on the rotary recording medium. The shift is not affected by the slow-motion ratio and the direction (forward direction and backward direction) of the slow-motion reproduction. According to the apparatus of the present invention, all that is required is to always form pulses for kicking or shifting the reproducing stylus at the predetermined mutually opposing positions on the rotary recording medium. Therefore, the circuit for forming the kick pulses can be simplified.

Still another object of the present invention is to provide an apparatus in which the reproducing stylus is always kicked to transfer to a track on the outer side, at a predetermined one of the predetermined mutually opposing positions. The reproducing stylus is kicked to transfer to a track on the outer or inner side, according to the reproducing direction, that is, according to whether the reproducing direction is in the forward direction or backward direction, at other positions.

Other objects and further features of the present invention will be apparent from the following detailed description when read in conjunction with the accompanying drawings.

DETAILED DESCRIPTION

First, a description will be given with respect to a rotary recording medium which is played by an apparatus according to the present invention may be applied with a periodical signal detection circuit, by making reference to FIGS. 1 and 2.

A video signal is recorded on a spiral track with pits formed on the disc 10 responsive to the information contents of the signal. Track turns of a single continuous spiral track, corresponding to each revolution of the disc 10, are designated by $t_1, t_2, t_3 \ldots$. As shown in FIG. 1, each track turn is constituted by the formation of pits 11 of the main information signal along the plane track path. No stylus guide groove is formed therein. With respect to one track turn $t_1$, in every horizontal scanning period (H) at a position corresponding to the horizontal blanking period, pits 12 of a first reference signal fp1 are formed on one lateral side of the track, as viewed in the tracking direction. Pits 13 of a second reference signal fp2 are formed on the other side of the track.

At an intermediate position between center lines of adjacent track turns, only pits of either one kind of the pits 12 and 13 of the above reference signals fp1 and fp2 are formed. With respect to one track, moreover, the sides on which the pits 12 and 13 are formed are changed over for every track turn. That is, if pits 12 and 13 are respectively formed on the right and left sides of one track turn, for example, pits 13 and 12 are respectively formed on the right and left sides of each of the adjacent track turns.

Figure 2:
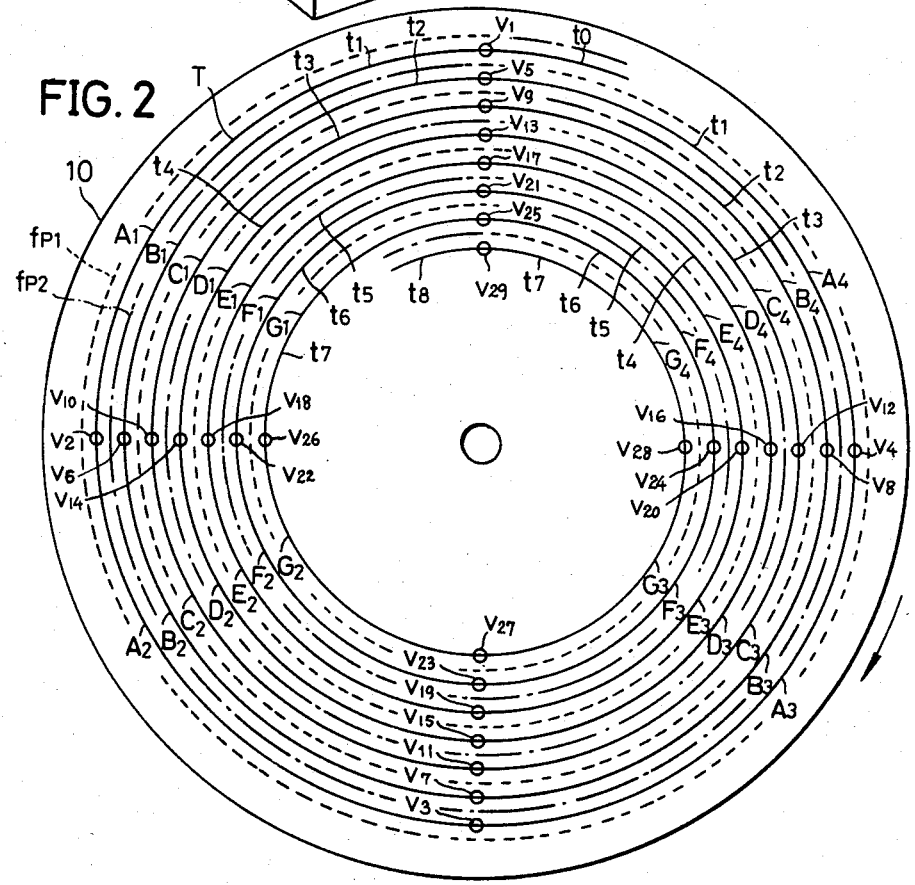
FIG. 2 is a diagram for explaining the recorded reference signals on a track pattern on a rotary recording medium.

As indicated in FIG. 2, a video signal is recorded along a spiral track T of the disc 10 for two frames, that is, four fields, per one revolution of the disc. In FIG. 2, the tracks of the reference signal fp1 are shown by dotted lines while the tracks of the reference signal fp2 are shown by one-dot chain lines. The positions of the vertical synchronizing signals of respective fields are designated by reference characters $V_1, V_2, V_3, \ldots$. The successive track parts corresponding to one revolution of the disc of a single spiral track T are respectively designated by track turns $t_1, t_2, t_3, \ldots$. Furthermore, a third reference signal fp3 is recorded at the starting end positions $V_1, V_5, V_9, \ldots$ of each track turns $t_1, t_2, t_3, \ldots$, that is, at positions where the reference signals fp1 and fp2 change over. A video signal of four fields, namely A1, A2, A3, and A4, is recorded in the track turn $t_1$. A video signal of four fields B1, B2, B3, and B4 is recorded in the track turn $t_2$. Similarly, video signals of four fields C1~C4, D1~D4 ... are respectively recorded in the track turns $t_3, t_4, \ldots$.

Figure 1:
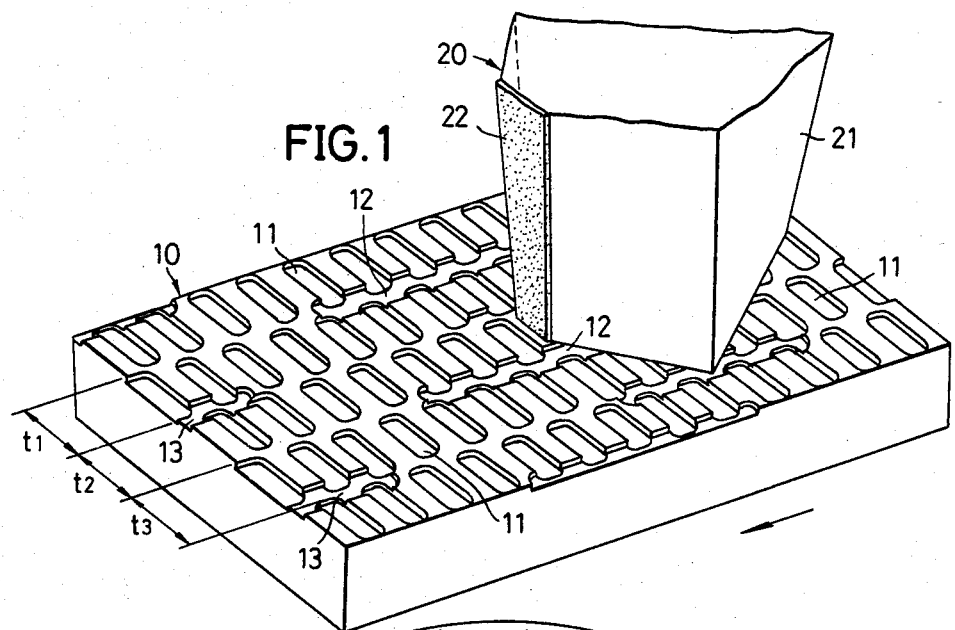
FIG. 1 is a perspective view showing an enlarged part of a rotary recording medium, together with a tip end part of a reproducing stylus.

The tip end of a reproducing stylus 20 has a shape shown in FIG. 1. The reproducing stylus 20 consists of a stylus structure 21 having a disc tracing surface which has a width greater than a track width. An electrode 22 is fixed to the rear face of the stylus structure 21. As the reproducing stylus 20 traces along a track on the disc 10 which is rotating in a direction indicated by an arrow, the video signal recorded thereon by the formation of pits is reproduced as variations in the electrostatic capacitance between the surface of the disc 10 and the electrode 22 of the reproducing stylus 20.

Figures 3, 4:
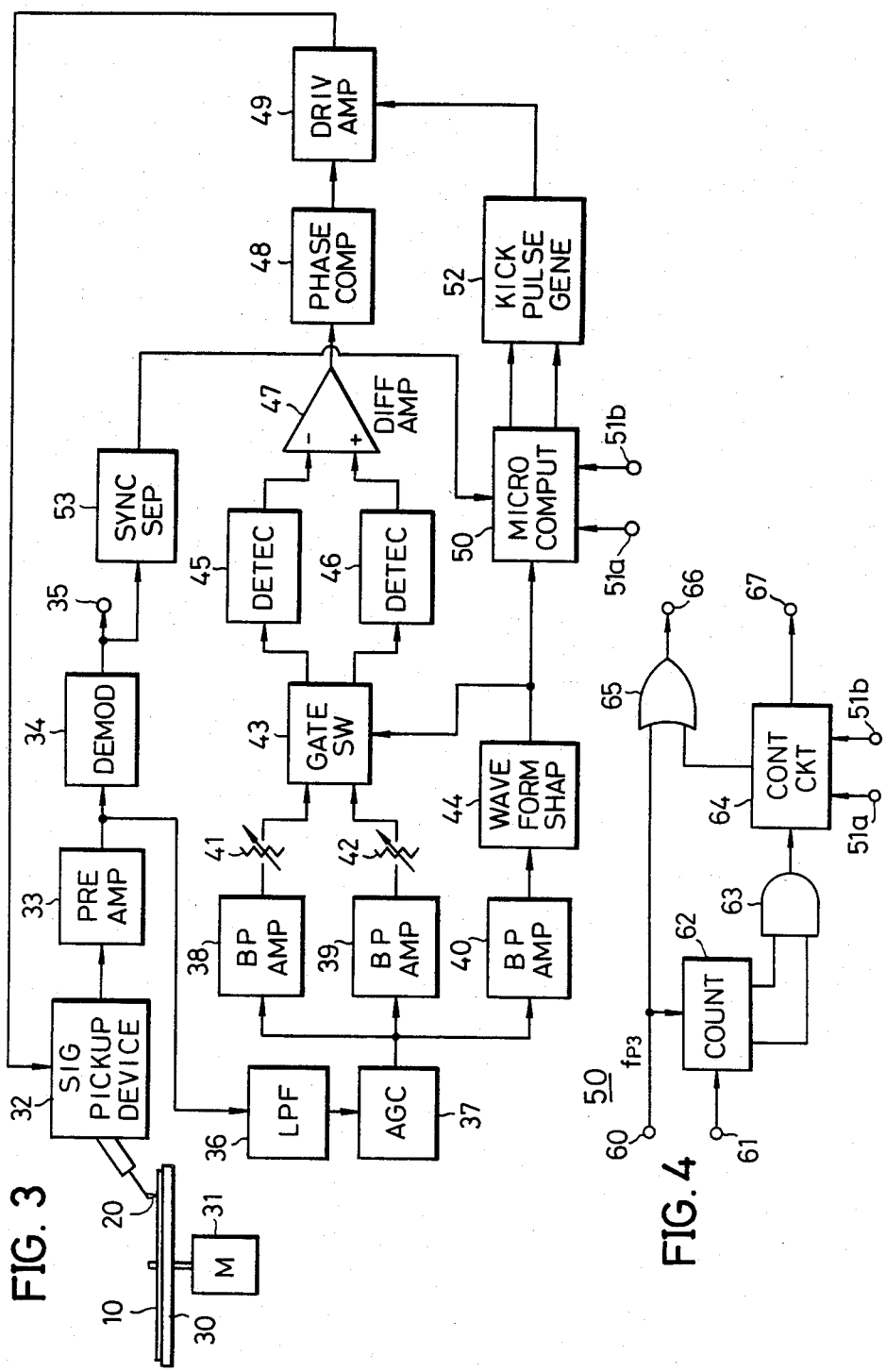
FIG. 3 is a systematic block diagram showing an embodiment of an apparatus according to the present invention.
FIG. 4 is systematic circuit diagram showing an embodiment of an essential part of the block system shown in FIG. 3.

In FIG. 3, the disc 10 is placed onto a turntable 30, and rotated at a rotational speed of fifteen revolutions per second, that is, 900 revolutions per minute, by a motor 31. A reproduced signal picked up from the disc 10 as minute variations in the electrostatic capacitance by the reproducing stylus 20 of a signal pickup device 32, is supplied to a preamplifier 33 having a resonant circuit. The resonance frequency of the resonant circuit varies in response to this variation in the electrostatic capacitance, and is formed into a signal of a desired level. The resulting output of the preamplifier 33, is demodulated into the original video signal by a demodulator 34 and is obtained as an output through an output terminal 35.

The output signal of the preamplifier 33 is supplied to a lowpass filter 36 wherein the reference signals fp1, fp2, and fp3 are separated. The output reference signals pass through an automatic gain control circuit 37 and are respectively supplied to amplifiers 38, 39, and 40. Here, each of the amplifiers 38, 39, and 40 is similar to a band-pass amplifier respectively designed to have steep passing frequency characteristics at only the respective frequency fp1, fp2 and fp3. As a result, the signals having frequencies fp1 and fp2 are respectively separated and obtained from the amplifiers 38 and 39. These signals respectively pass through level adjustors 41 and 42, wherein the levels of the signal are adjusted. The resulting signals are then supplied to a gate switching circuit 43.

The reference signal fp3 separated and amplified at the above band-pass amplifier 40, is supplied to a waveform shaping circuit 44 comprising a Schmitt circuit. The signal thus supplied to the waveform shaping circuit 44 undergoes a waveform-shaping so that the signal is not affected by noise and other influences. The reference signal fp3 thus subjected to the waveform-shaping, is supplied to the gate switching circuit 42 as a switching pulse, and also to a micro-computer 50, which will be described hereinafter.

The gate switching circuit 43 switches the reference signals fp1 and fp2 every one revolution period of the disc 10 upon normal reproduction. Switching is in response to the switching pulse. Hence, due to the switching pulse which reverse polarity every two frames (1/15 seconds), the reference signals fp1 and fp2 are alternately supplied to detection circuits 45 and 46 with predetermined polarities. The reference signals are taken from the gate switching circuit 43.

The detection circuits 45 and 46 detect the envelopes of their respective input reference signals, and convert the input reference signals into DC voltages. These DC voltages are then respectively supplied to a differential amplifier 47. The differential amplifier 47 compares the output signals of the two detection circuits 45 and 46 which vary in response to the reproduced levels of the reference signals fp1 and fp2, and generates an output tracking error signal which indicates the tracking error direction and the error quantity. This error signal passes through a phase compensation circuit 48 and is further amplified to a specific level by a driving amplifier 49.

An output signal of the driving amplifier 49 is applied to a coil of the signal pickup device 32, as a control signal, to control the signal pickup device 32. Accordingly, a cantilever arm having the reproducing stylus 20 mounted thereon undergoes displacement whereby the reproducing stylus 20 is tracking controlled so that the above tracking error signal becomes zero. That is, the reproducing stylus 20 correctly traces over the track T of the disc 10.

The essential operation of the above micro-computer 50 will now be described in conjunction with FIG. 4 which shows a circuit equivalent to the essential part of the micro-computer 50. In FIG. 4, the third reference signal fp3 from the waveform shaping circuit 44 is obtained through a terminal 60, and is supplied to a counter 62 and to an OR-gate 65. On the other hand, the video signal which is demodulated at the demodulator 34 shown in FIG. 3 is supplied to a synchronizing signal separation circuit 53 wherein the vertical synchronizing signal is separated. This separated vertical synchronizing signal is supplied to the counter 62 through a terminal 61 shown in FIG. 3. The counter 62 constructs a $\frac{1}{4}$ frequency-divider, for example, and is set by the third reference signal fp3 obtained from the terminal 60. Hence, the counter 62 divides the frequency of the vertical synchronizing signal obtained from the terminal 61 into $\frac{1}{4}$ the original frequency, and supplies this frequency divided output as a two-bit signal to an AND-gate which constructs a decoder. The above AND-gate 63 becomes synchronized with a vertical synchronizing signal which is applied for the second time after the third reference signal fp3 is applied to the counter 62, to produce and supply a signal to a kick control circuit 64.

The control circuit 64 is supplied in advance with a slow-motion ratio setting signal of the slow-motion reproduction from a terminal 51a, and a direction setting signal of the slow-motion reproduction for determining whether the slow-motion reproduction is in the forward direction or the backward direction. Accordingly, the control circuit 64 is preset with the slow-motion ratio and the direction of the slow-motion reproduction. Accordingly, the control circuit 64 produces a signal which is preset in accordance with the slow-motion ratio, in response to the signal obtained from the AND-gate 63. That is, the control circuit 64 produces a signal through an output terminal 67 when the preset direction of the slow-motion reproduction is in the forward direction. When the slow-motion reproduction is in the backward direction, the control circuit 64 produces a signal through an output terminal 66, by way of the OR-gate 65. The third reference signal from the terminal 60 is obtained from the output terminal 66 through the OR-gate 65. Therefore, regardless of the direction of the slow-motion reproduction, an output is always obtained with respect to the third reference signal. If the slow-motion ratio is preset in the control circuit 64 by an expression M/N (M and N are positive integers satisfying the relationship M<N), the control circuit 64 produces a signal M times every time the signal from the AND-gate 63 is supplied N times thereto.

The signals obtained through the terminals 66 and 67 are respectively supplied to a kick pulse generator 52 shown in FIG. 3. The waveform of the signals supplied to the kick pulse generating circuit 52 is shaped, and then supplied to the driving amplifier 49. A tracking control coil of the signal pickup device 32 receives the kick pulse through the driving amplifier 49. Accordingly, the signal pickup device 32 kicks or shifts the reproducing stylus 20 by one track pitch at the point in time when the kick pulse is applied. The shift is in the direction of the periphery or the inner periphery of the disc according to the polarity of the kick pulse. Moreover, when the tracking coil of the signal pickup device 32 receives a kick pulse which is formed in accordance with the output obtained from the output terminal 66, the reproducing stylus 20 is kicked by one track toward the outer periphery of the disc. On the other hand, when the tracking coil receives a kick pulse which is formed in accordance with the output obtained from the output terminal 67, the reproducing stylus 20 is kicked by one track toward the inner peripheral direction of the disc.

Therefore, the output from the output terminal 66 always appears when the third reference signal is reproduced. At the positions V1, V5, V9, . . . , on the disc where the third reference signal is recorded, the reproducing stylus is always shifted to a track on the outer side, by one track pitch. Furthermore, the signals produced from the control circuit 64 and obtained through the output terminals 66 and 67 are in synchronism with the output signal of the AND-gate 63. These output signals from the control circuit 64 are produced when the reproducing stylus 20 is reproducing a vertical synchronizing signal at the positions V3, V7, V11, . . . , along the radial direction of the disc 10 which oppose the recorded positions of the third reference signal fp3. Accordingly, the reproducing stylus 20 is kicked toward the outer side or the inner side by one rack pitch at the opposing positions V3, V7, V11, . . . , according to the signals obtained through the output terminals 66 and 67. The direction toward which the reproducing stylus 20 is kicked and the number of times which the reproducing stylus 20 is kicked, are determined by the slow-motion ratio and the direction of the slow-motion reproduction.

Next, description will be given with respect to the manner in which the above reproducing stylus is kicked when the kick pulse is applied to the tracking coil.

Figure 5:
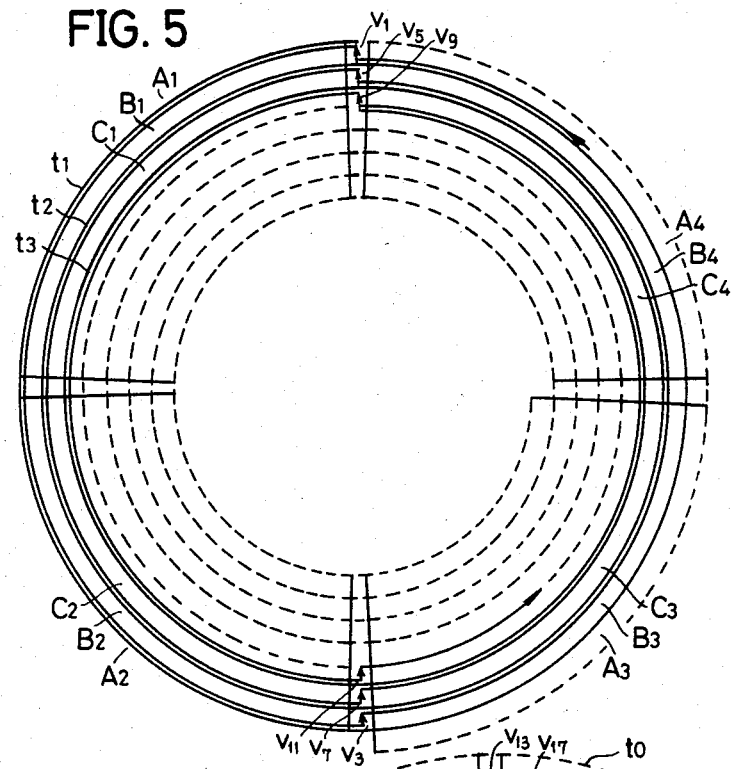
FIG. 5 is a diagram showing the tracking of the reproducing stylus during a ½-speed forward slow-motion reproduction.

For example, in the case of a $\frac{1}{2}$-speed slow-motion reproduction in the forward direction, the reproducing stylus 20 traces over a locus or path indicated in FIG. 5. In FIG. 5, dotted lines indicate the recording tracks $t_1$, $t_2$, $t_3$, . . . , shown in FIG. 2 by solid lines. Solid lines in FIG. 5 indicate the scanning locus of the reproducing stylus 20. Further, solid double-lines indicates that the reproducing stylus 20 has traced the identical track two times.

During the $\frac{1}{2}$-speed slow-motion reproduction in the forward direction, the control circuit 64 produces one signal from the output terminal 67 after two output signals of the AND-gate 63 are supplied thereto. Accordingly, the reproducing stylus 20 starts scanning from the position V1, for example, and scans over the track $t_1$ to reproduce the fields A1 and A2. The reproducing stylus 20 then passes over the position V3 to reproduce the fields A3 and A4. Moreover, the reproducing stylus 20 responds to the output signal from the terminal 66 at the position V5, and is kicked toward the outer side, to the starting end of the track $t_1$. Therefore, the reproducing stylus 20 again reproduces the fields A1 and A2 of the track $t_1$, and reaches the position V3. At this time, a signal is produced through the terminal 67. Thus, the reproducing stylus 20 responds to this signal and is kicked toward the inner side to the track $t_2$. The reproducing stylus 20 thereafter reproduces the fields B3 and B4 of the track $t_2$, and is kicked again toward the outer side at the position V5. Then, the reproducing stylus 20 reproduces the fields B1, B2, B3, and B4 of the track $t_2$, is kicked again toward the outer side at the position V5, and again reproduces the fields B1 and B2 of the track $t_2$. The reproducing stylus 20 is thereafter kicked towards the inner side to the track $t_3$ at the position V7.

Hence, the reproducing stylus 20 substantially scans over each of the tracks $t_1$, $t_2$, $t_3$, . . . , two times. Moreover, since the track which is scanned successively moves towards the inner side, a $\frac{1}{2}$-speed slow-motion is reproduced picture in the forward direction.

Figure 6:
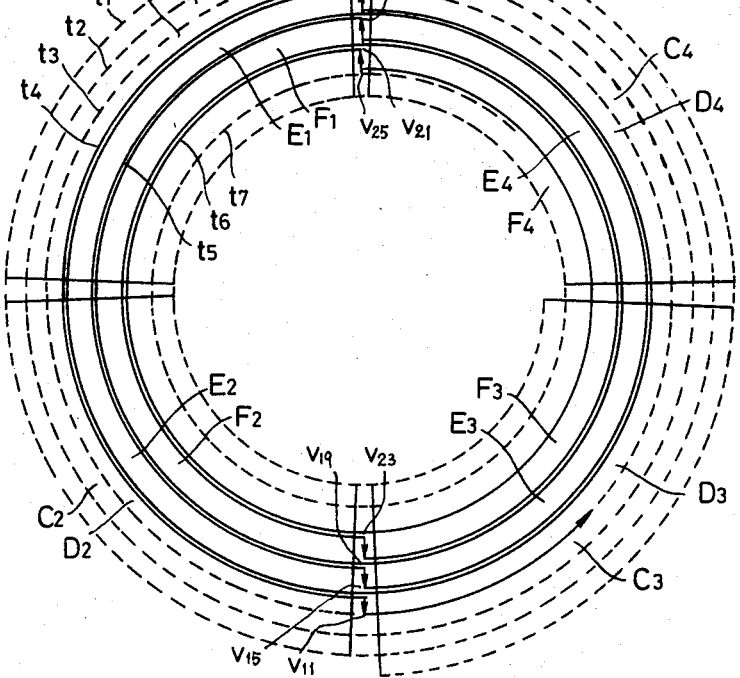
FIG. 6 is a diagram showing the tracking of the reproducing stylus during a ½-speed backward slow-motion reproduction.

In the case of a $\frac{1}{2}$-speed slow-motion reproduction in the backward direction, the reproducing stylus 20 traces over a locus or path indicated in FIG. 6. During this reproduction mode, the control circuit 64 gives one signal to the OR-gate 65 when the output signal of the AND-gate 63 gives two signals to the control circuit 64. For example, the reproducing stylus 20 scans over the track $t_6$ from the position V21, and reproduces the fields F1, F2, F3, and F4. When the reproducing stylus 20 reaches the position V5, the reproducing stylus 20 responds to the third reference signal fp3 obtained from the terminal 66, and is kicked toward the outer side to the starting end of the track $t_6$. After the reproducing stylus 20 again reproduces the fields F1 and F2 of the track $t_6$ and reaches the position V23, the reproducing stylus responds to the signal from the control circuit 64 obtained through the terminal 66, and is kicked toward the outer side to the track $t_5$. After the reproducing stylus 20 reproducing the fields E3 and E4 of the track $t_5$ and reaches position V21, the reproducing stylus 20 is kicked toward the outer side to the starting end of the track $t_5$. Similarly thereafter, the reproducing stylus 20 reproduces the fields E1, E2, E3, and E4 of the track $t_5$. Moreover, the reproducing stylus 20 is kicked to reproduce the fields E1 and E2, and is next kicked and moved to the track $t_4$.

Accordingly, the reproducing stylus 20 scans over each of the tracks $t_6$, $t_5$, $t_4$, . . . , two times. Moreover, since the track which is scanned successively moves toward the outer side, a $\frac{1}{2}$-speed slow-motion picture is reproduced in the backward direction.

Figure 7:
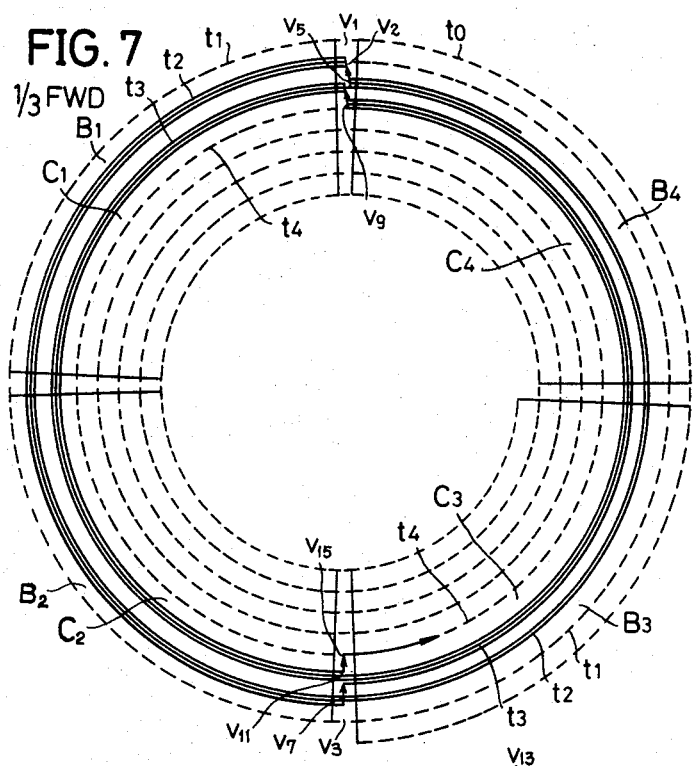
FIG. 7 is a diagram showing the tracking of the reproducing stylus during a ⅓-speed forward slow-motion reproduction.

Next, in the case of a $\frac{1}{3}$-speed slow-motion reproduction in the forward direction, the reproducing stylus 20 traces over a locus or path indicated in FIG. 7. In this reproducing mode, the control circuit 64 produces a signal once through the terminal 67 after three output signals of the AND-gate 63 is supplied to the control circuit 64. For example, when the reproducing stylus 20 reaches the position V5 after reproducing the fields B3 and B4 of the track $t_2$, the reproducing stylus 20 responds to the third reference signal fp3 from the terminal 66. Accordingly, the reproducing stylus 20 is kicked toward the outer side to the starting end of the track $t_2$, to reproduce the fields B1, B2, B3, and B4. When the reproducing stylus 20 again reaches the position V5, the reproducing stylus 20 is kicked toward the outer side to the track $t_2$, and again reproduces the fields B1, B2, B3, and B4. The reproducing stylus 20 is again kicked toward the outer side to the track $t_2$ when the reproducing stylus 20 again reaches the position V5, and reproduces the fields B1 and B2. When the reproducing stylus 20 reaches the position V7, the reproducing stylus 20 responds to the signal received from the control circuit 64 through the terminal 67, and is kicked toward the inner side to the track $t_3$. The reproducing stylus 20 is then kicked toward the outer side after reproducing the fields C3 and C4 of the track $t_3$, and scans the track $t_3$ from the starting end thereof. Similarly thereafter, the reproducing stylus 20 scans over the entire track $t_3$ two times, and scans over half the track for the third time. When the reproducing stylus 20 reaches the position V11, the reproducing stylus 20 is kicked toward the inner side and moved to the track $t_4$. The reproducing stylus 20 scans over the tracks in a similar manner thereafter.

Accordingly, the reproducing stylus 20 scans over each of the tracks $t_2$, $t_3$, $t_4$, . . . , three times. Moreover, since the track which is scanned successively moves toward the inner side, a $\frac{1}{3}$-speed slow-motion reproduced picture in the forward direction is obtained.

Figure 8:
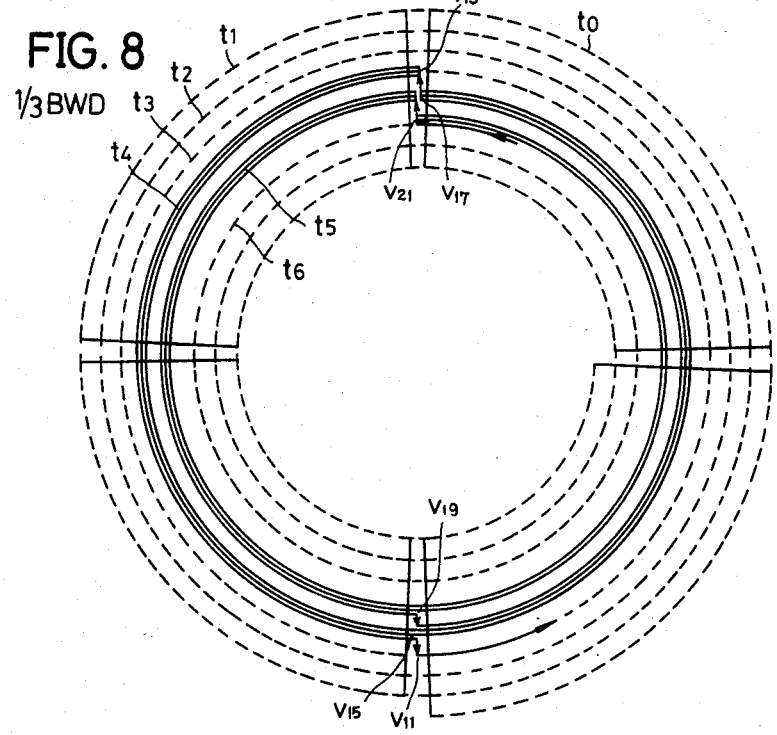
FIG. 8 is a diagram showing the tracking of the reproducing stylus during a ⅓-speed backward slow-motion reproduction.

During a $\frac{1}{3}$-speed slow-motion reproduction in the backward direction, the reproducing stylus 20 traces over a locus or path indicated in FIG. 8. In this reproducing mode, the reproducing stylus 20 is kicked toward the outer side once every three times, at positions V19, V15, V11, . . . , opposing the positions V21, V17, . . . , where the third reference signal is recorded. Hence, as easily understood from the above description for the various reproduction modes, the reproducing stylus 20 scans over each of the tracks $t_5$, $t_4$, $t_3$, . . . , three times. Moreover, since the track which is scanned successively moves toward the outer side, a $\frac{1}{3}$-speed slow-motion picture is reproduced in the backward direction.

In the present embodiment of the invention, the reproducing stylus 20 is always kicked toward the outer side at the positions V1, V5, V9, . . . , where the third reference signal is recorded. The reproducing stylus 20 is kicked a number of times at the opposing positions V3, V7, V11, . . . , according to the slow-motion ratio and to the direction of the slow-motion reproduction. However, the kicking positions are not limited to these positions. The same positional relationship can be obtained when other positions V2, V5, V10, . . . , and opposing positions V4, V8, V12, . . . , are used.

Therefore, according to the apparatus of the present invention, the micro-computer 50 produces a signal for kicking the reproducing stylus toward the outer side. The reproducing stylus is always kicked at a position corresponding to a predetermined position on the disc. Hence, the programming procedure for the above micro-computer 50 can be simplified. Furthermore, there is an advantage in that, when realizing a circuit which performs an equivalent operation as that performed by the micro-computer, the circuit can be simplified.

Further, the present invention is not limited to these embodiments, but various variations and modifications may be made without departing from the scope of the invention.

What is claimed is:

1. An apparatus for playing back a rotary recording medium in which an even number of fields of video signals are recorded on each track turn of a spiral track, said apparatus comprising:

reproducing transducer means having a reproducing element for scanning over tracks on said rotary recording medium in order to reproduce recorded signals, and shifting means responsive to a signal applied thereto for shifting said reproducing element by one track pitch in a radial direction across said rotary recording medium; and circuit means for producing and applying a shifting signal to said shifting means to cause said reproducing element to shift by one track pitch toward an outer adjacent track on said rotary recording medium every time said reproducing element reaches one predetermined position on said rotary recording medium, and said means for producing the shifting signal operating responsive to a quasi-slow-motion ratio and to the direction of the quasi-slow-motion reproduction when said reproducing element reaches another predetermined position on said rotary recording medium, said tracks being scanned a plurality of times with respect to each track turn, to perform a quasi-slow-motion reproduction.

2. An apparatus as claimed in claim 1 in which said rotary recording medium has four fields of video signals recorded on each track turn, said one predetermined position on said rotary recording medium being a position having a vertical synchronizing signal recorded thereat, and said other predetermined position on said rotary recording medium being a position diametrically opposing said one predetermined position on said rotary recording medium and having the vertical synchronizing signal recorded thereat.

3. An apparatus as claimed in claim 2 in which said rotary recording medium has alternately recorded first and second reference signals for every one track turn, said reference signals being recorded between each track turn of said video signal tracks, and a third reference signal recorded at positions corresponding to the changeover positions where said first and second reference signals replace each other on each of said track turns, and said one predetermined position is a position where said third reference signal is recorded.

4. An apparatus as claimed in claim 3 in which, during an M/N-times speed (M and N are integers satisfying a relationship $M < N$) quasi-slow-motion reproduction, said circuit means producing said shifting signal to cause said reproducing element to shift to an outer adjacent track according to said third reference signal every time said reproducing element reproduces said third reference signal from said one predetermined position, and produces a shifting signal which causes said reproducing element to shift at said other predetermined position at a rate of M times after said reproducing element scans N times over the same track turn.

5. An apparatus as claimed in claim 4 in which, during a quasi-slow-motion reproduction in the forward direction, said circuit means produces said shifting signal to cause said reproducing element to shift toward an inner adjacent track at said other predetermined position.

6. An apparatus as claimed in claim 4 in which, during a quasi-slow-motion reproduction in the backward direction, said circuit produces a shifting signal which causes said reproducing element to shift to an outer adjacent track at said other predetermined position.

* * * * *